United States Patent [19]

Imhof

[11] Patent Number: 4,643,225
[45] Date of Patent: Feb. 17, 1987

[54] PRESSURE REGULATING VALVE

[75] Inventor: Rainer Imhof, Frammersbach, Fed. Rep. of Germany

[73] Assignee: Mannesmann Rexroth GmbH, Lohr, Fed. Rep. of Germany

[21] Appl. No.: 705,193

[22] Filed: Feb. 25, 1985

[30] Foreign Application Priority Data

Feb. 24, 1984 [DE] Fed. Rep. of Germany ....... 3406794

[51] Int. Cl.$^4$ .................................... F15B 13/044
[52] U.S. Cl. ............................ 137/596.17; 91/433; 137/625.64; 137/625.65
[58] Field of Search ............... 91/433; 137/14, 596.17, 137/625.64, 625.65

[56] References Cited

U.S. PATENT DOCUMENTS

| 4,023,593 | 5/1977 | Piccardo | 137/625.64 |
| 4,119,294 | 10/1978 | Schnorrenberg | 251/129 X |
| 4,316,599 | 2/1982 | Bouvet et al. | 137/625.65 X |
| 4,478,250 | 10/1984 | Lukasczyk et al. | 137/625.65 |

FOREIGN PATENT DOCUMENTS 2754878  6/1979  Fed. Rep. of Germany ........................ 137/625.64

*Primary Examiner*—Gerald A. Michalsky
*Attorney, Agent, or Firm*—Cushman, Darby & Cushman

[57] ABSTRACT

A proportional solenoid operated pressure regulating valve is disclosed. First and second metering spools are respectively mounted for movement inside first and second control spools. Each metering spool responds to a fluid pressure being controlled at a respective operating port.

7 Claims, 3 Drawing Figures

PRESSURE REGULATING VALVE

TECHNICAL FIELD

This invention relates generally to a pressure regulating valve and more particularly to a pressure regulating valve of the type where within a valve spool pressure metering spools are employed. One or more proportional solenoid(s) are used to actuate the pressure regulating valve.

BACKGROUND ART

Pressure regulating valves including those which are actuated by proportional solenoids are well known and are used for generating a pressure output signal which is proportional to an actuating force which acts on the control spool of the pressure regulating valve.

In a known pressure regulating valve the control spool of said pressure regulating valve comprises end faces which are designed to act as pressure metering areas. Provisions are made that the secondary pressure which builts up in the operating chamber of the valve, i.e. the chamber connected with a load can act upon said metering area, so that the control spool is moved contrary to the actuating force which also acts on the control spool. Eventually a balance will be achieved between the actuating force and the force created by the secondary pressure. In this known pressure regulating valve the diameter of the control spool will determine the size of the pressure metering surfaces or areas. If it becomes necessary to change the range within which the pressure may be adjusted then for such a valve the entire control spool has to be replaced, i.e. the entire valve has to be exchanged. Another disadvantage of this known valve resides in the fact that in the chambers at both ends of the control spool (chambers which are formed when the proportional solenoid is mounted on the valve housing) the full secondary pressure is present.

Applicant's proportional) valve disclosed in applicant's publication RD No. 29126/3.83 discloses a pressure regulating valve which makes use of metering spools provided at both ends of the control spool. Solenoids are provided at opposite ends of the valve housing and the solenoid pins abut at the appropriate metering spools. Assuming that the control spool is actuated by a proportional solenoid at one end, then the metering spool at the other end will be supplied with the secondary pressure, i.e. the pressure in the operating chamber which means the chamber which is connected with a load. Even though only one half of the control spool is active in controlling the fluid flow, the other half will also have to be moved together with the first-mentioned half, a situation which can lead to increased friction.

Applicant's proportional valve disclosed in applicant's publication RD No. 29384 uses two control spool means. It is a disadvantage that the size of the diameter of the two control spool means determines the size of the pressure metering area. Further, also the fluid will flow in axial direction through the control spool means. This causes a severe limitation of the amount of fluid which can be handled. The present invention is directed to overcoming one or more of the problems of the prior art, specifically the prior art set forth above.

DISCLOSURE OF THE INVENTION

In one aspect of the present invention a pressure regulating valve is disclosed as comprising a spool means for determining or measuring the pressure which is present in an operating or load chamber of the valve, i.e. a chamber which is adapted to be connected with a load.

In another aspect of the present invention two separate control spools are reciprocably mounted in a valve housing and in each of said control spools pressure measuring spools are reciprocably mounted. A spring is used to hold the two control spool means apart and in abutment with actuating means which serve for actuating said control spool means. Preferably the actuating means are solenoids. The solenoids abut with their solenoid pins at the other ends of said control spool means while the inner ends of said control spool means are used as abutment surfaces for said spring.

The built-in metering spool of the invention provides a high degree of independence with respect to the amount of fluid which can be handled. Also, different pressure ranges can be accommodated simply by varying the diameter of the measuring spool. Further, a lower degree of sensitivity with respect to contamination is achieved.

According to another aspect of the invention the valve is provided as a cartridge design. Due to the fact that the metering area is independent from the control spool diameter any influence by the power rating is avoided. Simply by varying the diameter of the metering spool the effectiveness of the secondary pressure can be influenced.

By changing the spring arranged between the inner ends of said spools a change of the control characteristic may be obtained. This is also true if only one control spool is used.

Preferably the disclosed pressure regulating valve is used as a pilot valve for a proportional directional control valve.

According to another preferred embodiment of the invention throttle or orifice means may be provided in the conduits leading to the working chamber(s).

Besides using proportional solenoids or switching solenoids as actuating means for the control spool, also mechanically or pneumatically operating actuating means may be used.

In accordance with another preferred embodiment of the invention it is provided that for a valve having two pressure metering spools which abut against each other the actuating means for the one control spool continuously applies to said control spool a substantially constant force (or possibly a variable force). At the same time the other control spool is acted upon by a force of the respective actuating means only if a reversal of the direction of movement of the load controlled by said valve is required. That last-mentioned force would be larger than the first-mentioned force. In this environment the valve of the invention would preferably act as a pilot valve for a main valve which, in turn, is connected to the load(s).

Other objects and advantages of the invention will become apparent upon reading the following detailed description and upon reference to the drawings, in which.

Figure 1:
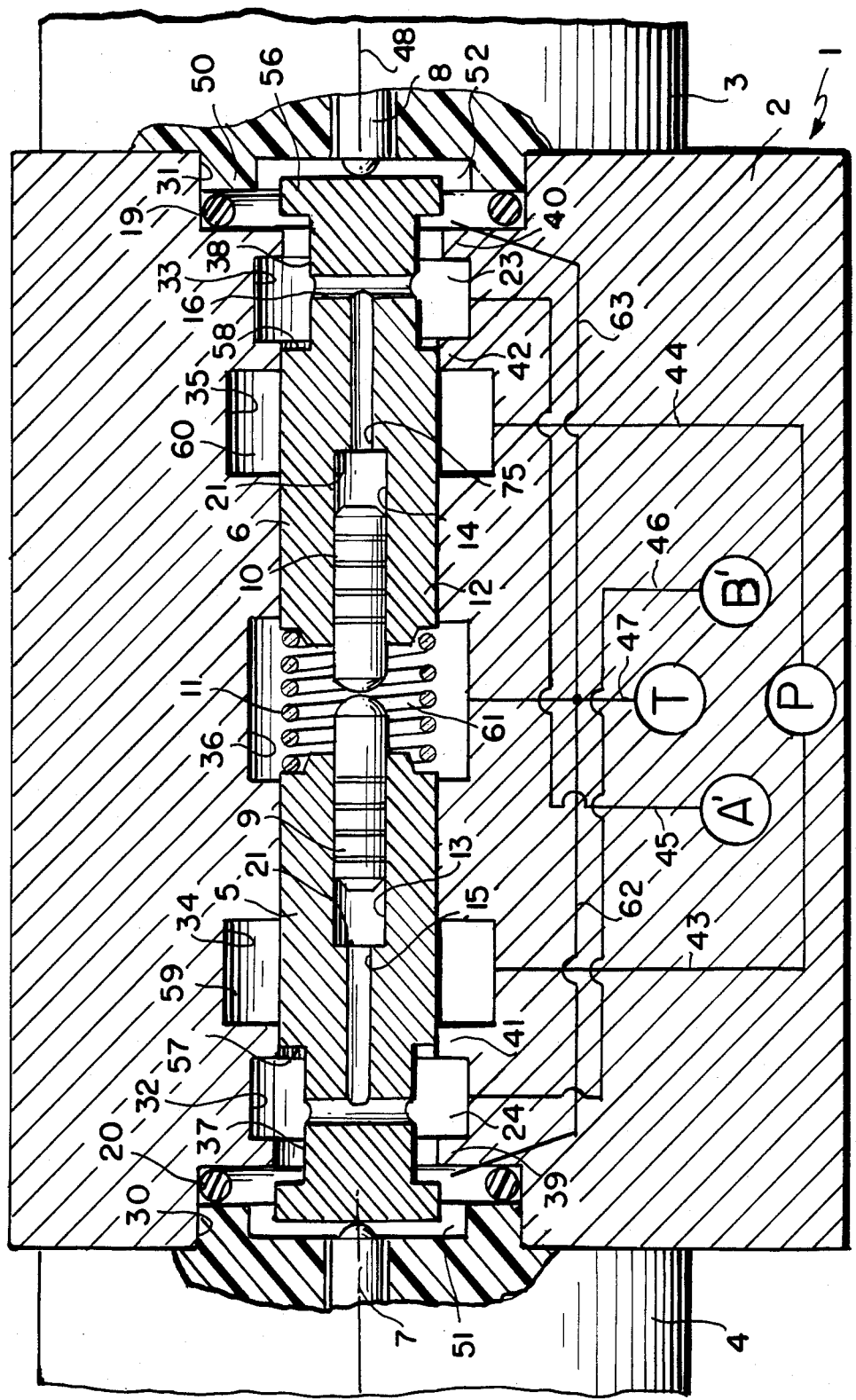
FIG. 1 is a longitudinal sectional view of a first embodiment of the invention disclosing a three-directional pressure regulating valve in its neutral position with the actuation of said valve being provided by two proportional solenoids.

FIG. 1 shows schematically a longitudinal sectional view of a pressure regulating valve 1. The pressure regulating valve 1 as shown belongs to the type providing three directions or paths and would therefore be called a three-directional pressure regulating valve. The pressure regulating valve 1 comprises a valve housing 2 with a longitudinal bore 12 extending therethrough. In the longitudinal bore 12, control spool means are reciprocably mounted. The control spool means as shown are provided in the form of two control spools 5 and 6, both of which are reciproably mounted in said longitudinal bore 12.

As is shown, each of said control spools 5 and 6, respectively, can be moved in the direction of the longitudinal axis 48 of the valve housing 2 by means of an actuating element 7 and 8, respectively. Preferably the actuating elements 7 and 8 are in the form of solenoid pins of proportional solenoids 4 and 3, respectively. A proportional solenoid is a solenoid having a proportional working characteristic.

Each of said proportional solenoids 3 and 4, respectively, is adapted to convert an electrical signal into a proportional force which is applied by means of solenoid pin 7 or 8 onto the appropriate control spool. An increase of the electrical signal, e.g. the control current, will cause a higher force generated by the proportional solenoid. Inasmuch as the proportional solenoids 3 and 4 are adapted to actuate the three-directional pressure regulating valve 1, the electrical signal applied to said proportional solenoids 3 and 4, respectively, will be converted into a proportional pressure output signal of the pressure regulating valve 1.

Following this general overview, the pressure regulating valve 1 will now be described in detail with reference to the drawing. Regarding FIG. 1, it should be noted that the pressure regulating valve 1 is of mirror-like design, i.e., it would suffice to describe just the one half of the valve and still the design of the full valve will be understood.

As already mentioned, the control spool means of valve 1 are realized in the form of two control spools 5 and 6. In FIG. 1 the control spools 5 and 6 are shown in their neutral or rest position. A spring 11 applies a force to the two end faces of said spools 5 and 6 which face towards each other. At the outer end faces of each of said control spools 5 and 6, the solenoid pins 7 and 8, respectively, of the proportional solenoids 4 and 3, respectively, are abutting. Each of said control spools 5 and 6, respectively, is provided with an annular recess 37 and 38, respectively. The recess 37 forms adjacent to the other surface of spool 5 a control land 55 and further, oppositely thereto, a control edge 57. Similarly, recess 38 forms a control land 56 and a control edge 58. In the area of the recess 37, a cross or radial bore 17 is provided. Radial bore 17 extends through the control spool 5 and through an axially arranged connecting bore 15. Said connecting bore 15 is connected with a longitudinal spool bore 13 having a larger diameter. The longitudinal bore 13 is open towards the inner end face of the control spool 5 and is adapted to receive a pressure measuring spool (measuring spool means) 9. The bottom of the longitudinal bore 13 defines for all practical purposes the pressure measuring area 21. The connecting bore 15 may have throttling characteristics.

Because of the mirror-like design, also a control spool 6 is provided with a cross or radial bore 16 in the area of process 38. Radial bore 16 is connected via a connecting bore 75 with a longitudinal spool bore 14. In said spool bore 14, a pressure measuring spool 10 is reciprocally mounted. In accordance with the invention, the two pressure measuring spools 9 and 10 can directly abut on each other as is shown in FIG. 1. In case that only one half of the valve is used, the measuring spool 9 has to be supported by an appropriate support; see FIG. 2.

The longitudinal bore 12 of the valve housing 2 comprises at its two ends an annular recess 30 and an annular recess 31, respectively. The annular recess 30 is adapted to receive a collar 49 of the appropriate proportional solenoid 4 and the annular recess 31 receives a collar 50 of the respective proportional solenoid 3. Seals 19 and 20 provide a sealing effect between the proportional solenoids 3, 4 and the valve housing 2.

Annular grooves 32 and 33, respectively, in the valve housing 2 form together with recesses 37 and 38, respectively, operating chambers 24 and 23, respectively.

The cross bores 16 and 17 are provided in the area of said operating chambers 23 and 24, respectively. Additional annular grooves 34 and 35, respectively, in the valve housing 2, arranged towards the inner portion of the valve housing, form pressure chambers 59 and 60, respectively. In the middle of the valve housing 2, another annular groove 36 is provided, a groove which forms the tank connecting—or spring chamber 61.

Annular lands 39 and 40, respectively, form the border between a solenoid pin space 52 and the operating chamber 23. An annular land 41 and 42, respectively, forms the limit for operating chamber 24 and pressure chamber 59 and, respectively, the working chamber 23 and the pressure chamber 60.

Typically, a pressure source in the form of a pump P is connected via a not shown pressure inlet port and a conduit 43 with the pressure chamber 59, and the pump P is further connected via an inlet port and conduit 44 with the pressure chamber 60. The tank T is connected via a tank port (not shown) and a tank conduit 47 with the tank- or spring chamber 61. The tank chamber 61 is provided in the area of the inner end faces of the control spools 5, 6.

Moreover, tank T is connected via conduit 62 with the solenoid pin space 51 and via a conduit 63 with the solenoid pin space 52. A load A' is connected via a operating port (not shown) and an operating conduit 45 with the operating chamber 23. A second load B' is connected via another operating port (not shown) as well as an operating conduit 46 with the operating chamber 24.

The valve as shown in FIG. 1 is in its neutral or rest position, i.e., none of the proportional solenoids 3 and 4 is energized, and spring 11 maintains the control spools 5 and 6, respectively, in abutment with the solenoid pins 7 and 8, respectively. As a consequence, operating chamber 24 and pressure chamber 59 as well as operating chamber 23 and pressure chamber 60 are not connected with each other. Operating chambers 23 and 24, respectively, are connected with the pin space 52 and 51, respectively and are consequently without pressure. This initial or neutral position is fixed by means of spring 11. To use a spring 11 has the advantage that the neutral position is safely achieved.

For an explanation of the operation of the valve, it is assumed that it is required to supply load B' with a fluid having a predetermined pressure. To achieve this goal, the proportional solenoid 4 is energized so that solenoid pin 7 moves from the position shown in FIG. 1 rightwardly and moves the control spool 5 towards the right into an operating position. As soon as the control edge 57 is spaced from annular land 41, fluid coming from pump P will flow from pressure chamber 59 to operating chamber 24. Further, fluid from operating chamber 24 will flow via conduit 46 to load B'. Simultaneously fluid will flow via cross bore 17 and connecting bore 15 into the longitudinal bore 13 and will act upon the pressure metering spool 9 on the basis of pressure metering area 21. For all practical purposes, the control spool 6 and the pressure metering spool 10 remain during the control operation in their rest position, i.e., metering spool 10 forms (after having abutted at the appropriate metering area) the abutment for pressure metering spool 9, and the control spool 6 is the abutment for spring 11.

The secondary pressure which is built up in the longitudinal bore 13 acts via the pressure metering area 21 upon the control spool 5 and the pressure force resulting therefrom acts against the force generated by the proportional solenoid 4, a force which is transmitted as an actuating force via the solenoid pin. The resulting pressure force moves the control spool 5 to such a degree in the direction of closing until the balance between the two forces is achieved.

In case that the actuating force of the solenoid pin 7 is further increased, a higher pressure can be built up in the operating chamber 24 and consequently also at the load B'. However, also the secondary pressure acting on the pressure metering surface 21 will be increased so that a larger force is created which will act against the operating force of the solenoid pin 7. This will allow the adjustment of the pressure regulating valve on a higher pressure level.

In contrast thereto, a reduction of the operating force of the solenoid pin 7 has the result of an excess of pressure force at the pressure metering area 21 so that the control spool 5 is moved to such a degree towards the left-hand side until the inflow of fluid (pressure medium) from the pressure chamber 59 to the operating chamber 24 is interrupted and the operating chamber 24 is connected with the pressureless chamber 51. The secondary pressure is thereby reduced only to such a degree that the operating force of the pin 7 is in balance with the pressure force at the metering area 21.

The pressure adjustment for the load A' is provided for in the same manner if the pin 8 is actuated by the proportional solenoid 3. Depending on which of the proportional solenoids is operated, the pressure in two operating chambers 23 and 24 may be controlled.

The load can be, for instance, servomotors. However, specifically the pressure regulating valve 1 of the invention can be used as a first stage for a proportional directional control valve.

Figure 2:
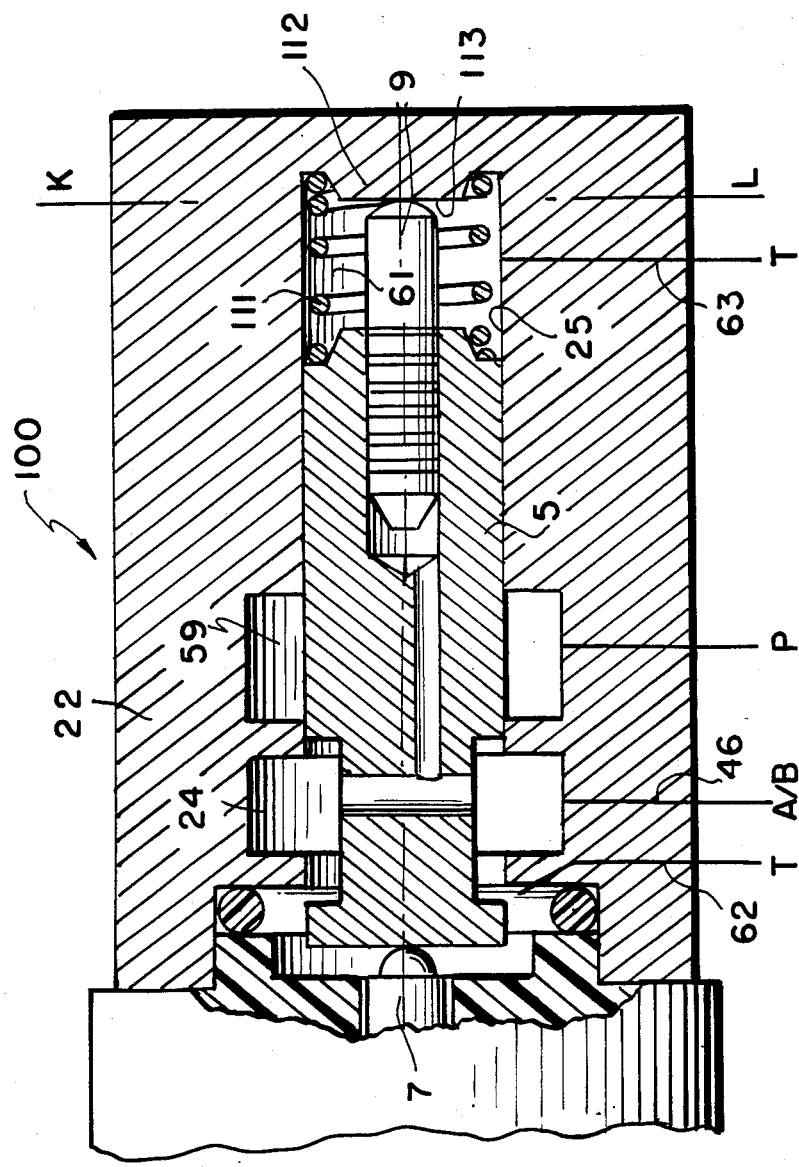
FIG. 2 is a cartridge design of the three-directional pressure regulating valve of FIG. 1 with only one solenoid being used to actuate the valve.

The embodiment of FIG. 2 is a so-called separated system, i.e. two control spools 5 and 6 separated from each other are used. The use of a separate system has the following advantages;

One advantage of the pressure regulating valve 1 of FIG. 1 resides in the fact that the metering spools 9 and 10 directly support each other. No separating element is necessary between the two metering spools.

The two control spools 5 and 6 are coupled by means of a spring 11. This guarantees a safe separation of load A' with respect to the tank or separation of B' with respect to the tank. Even though the use of spring 11 can have great advantages, said spring may also be deleted.

For a predetermined maximum force of the proportional solenoid, the selection of the diameter (9 and 10) of the pressure metering spool allows the determination of the possible maximum pressure.

Figure 3:
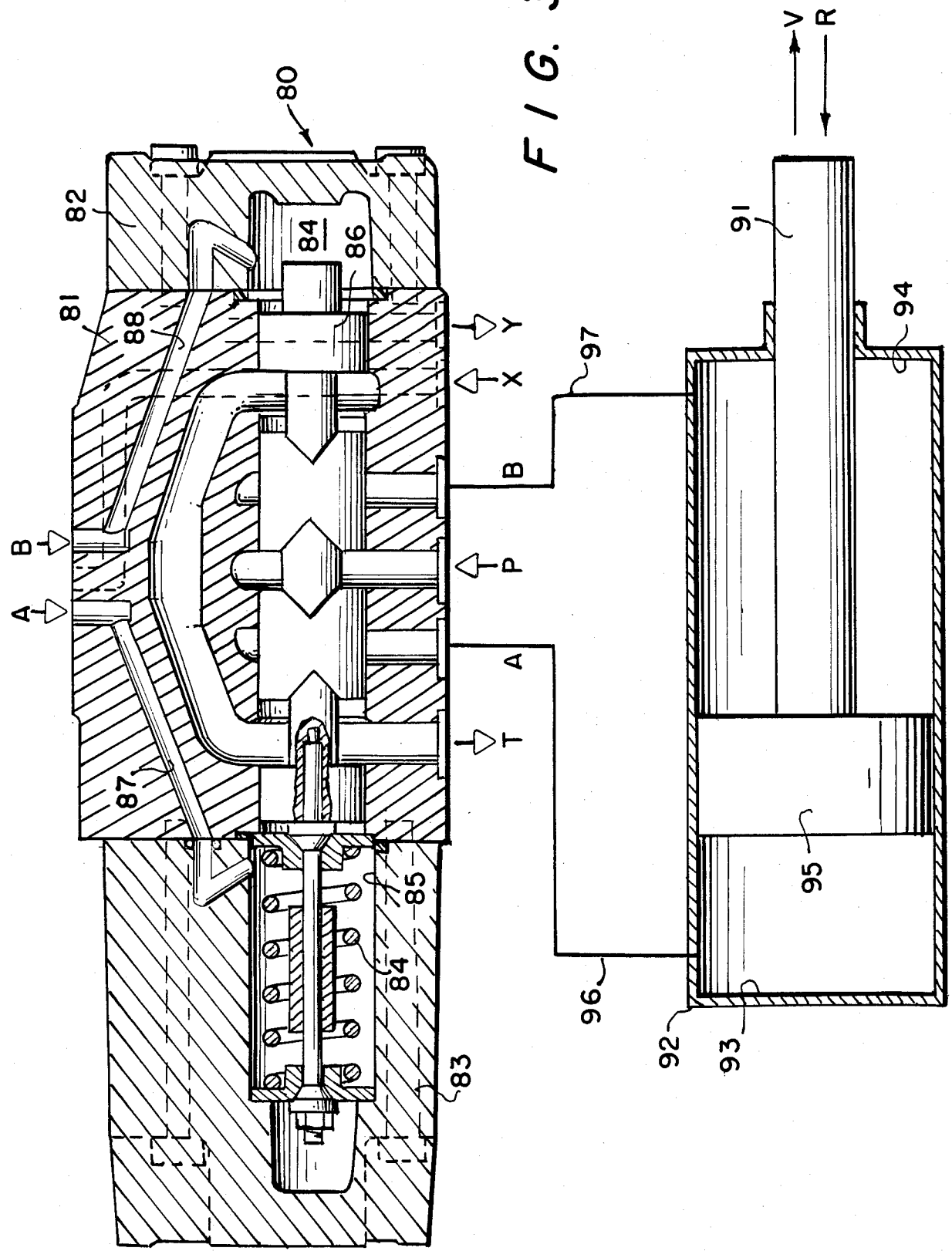
FIG. 3 is a schematic longitudinal sectional view of another embodiment of the invention.

Summarizing the invention of FIG. 1, it should be noted that this pressure regulating valve can be used independently or as the first stage for a main valve, for instance a main valve shown in FIG. 3 and designated by reference numeral 80.

Normally, the valve of FIG. 1 is actuated in such a manner that either the one control spool 5 or the other control spool 6 are actuated by actuating means. However, the valve embodiment of FIG. 1 is also useful when both control spools 5 and 6 are actuated. This possibility entails large advantages and, therefore, this possibility will be explained below referring to FIG. 3. However, first the embodiment of FIG. 2 will be described.

FIG. 2 is a longitudinal sectional view of a second embodiment of a pressure regulating valve. The valve of FIG. 2 shows two aspects of the invention. According to a first aspect of the invention the pressure valve of FIG. 1 can be designed as a cartridge. According to a second aspect the pressure valve of FIG. 1 can also be designed with just one control spool 5.

The pressure regulating valve of FIG. 2 corresponds to the left half of the pressure regulating valve shown in FIG. 1. Therefore, the reference numerals used in connection with FIG. 1 can be used to a large degree when describing the embodiment of FIG. 2. Components not specifically described when referring to FIG. 2 may be understood when looking at the corresponding components shown in FIG. 1. The pressure regulating valve 100 shown in FIG. 2 comprises a cartridge housing 22 having preferably a circular cylindrical cross-section. The cartridge housing 22 is adapted to be inserted into a longitudinal bore provided in a valve housing (not shown). A blind bore 25 extends in longitudinal direction through the cartridge housing 22. In said blind bore 25 a control spool 5 is reciprocably mounted. The control spool 5 is similar to the spool 5 of FIG. 1 and is adapted to receive a pressure metering spool 9 at its end which is opposite to the end at which the solenoid pin 7 of the proportional solenoid 4 abuts. In the cartridge housing 22 conduits similar to the conduits 43, 46 and 62 and 63 of the embodiment of FIG. 1 are provided, said conduits being connected with corresponding chambers 59, 24, 51 and 61. The cartridge housing 22 comprises a bottom wall 112 as is shown in FIG. 2. The bottom wall 112 forms an abutment surface 113 for a spring 111 a spring which corresponds to spring 11 of FIG. 1.

The pressure regulating valve 100 of FIG. 2 in its disclosed form is adapted to supply only one load A' or B' with pressurized fluid.

If two pressure regulating valves 100 of the type shown in FIG. 2 are arranged in a corresponding longitudinal bore of a valve housing, so that the bottom walls 112 of said valve 100 abut, then an arrangement similar to the arrangement of FIG. 1 is achieved. However, the two pressure metering spools 9, 10 do not abut at each other but only at the appropriate bottom wall 112. Therefore, a completely independent operation of the two control spools 5 and 6 is possible. Another modification is possible when the two bottom walls 112 of two aligned pressure valves 100 are removed. One would have to imagine that the bottom wall 112 is cut off along the K—L in FIG. 2. Instead of the two bottom walls 112 simply a disc would be placed between the two cartridge housings 22. Again two separate springs 111 would be present, springs 111 which would abut at said disc. Also, the two pressure metering spools 9 and 10 could find an abutment at said disc.

A third modification of the pressure regulating valve 100 of the cartridge type of FIG. 2 could be used to realize the embodiment of FIG. 1 simply by not using the above-mentioned disc and by using just one spring 11. This would basically lead to the same arrangement as is shown in FIG. 1, but this time the pressure regulating valve 1 would be of the so-called cartridge type, a type which can be easier manufactured.

FIG. 3 is intended to explain another embodiment of the invention, an embodiment wherein the pressure regulating valve 1 of FIG. 1 is used as a first stage valve (or a pilot control valve) for the main valve 80 shown in FIG. 3. As an example for a load a hydraulic cylinder 90 is shown. For reasons of simplicity FIG. 3 only discloses the main valve 80 to which the pressure regulating valve 1 of FIG. 1 is connected. In fact, the loads A' and B' in FIG. 1 are connected with the arrow heads designated A' and B' in FIG. 3. Said arrow heads A' and B' in FIG. 3 designate ports of the main valve 80.

The main valve 80 comprises a main valve housing 81 having a a longitudinal bore extending therethrough. Within said longitudinal bore a main spool 86 is reciprocally mounted. The main valve housing 81 is closed at the right-hand side by means of a cap 82 clearly shown in FIG. 3. By means of cap 82 a pressure chamber 89 is formed adjacent to one end of the main spool 86. At the opposite end of the main valve housing 81 a cap 83 forms a spring or pressure chamber 85. A double-acting spring 84 is arranged in said pressure chamber 85. Spring 84 is coupled with the main spool 86 in such a manner that said spool 86 is centered, and a movement of said spool 86 in the one or the other direction will have to overcome the force of spring 84. Port A' is connected via conduit 87 with pressure chamber 85. Port B' is connected via conduit 88 with pressure chamber 89. The ports of the main valve 80 shown at the opposite side to the ports A' and B' are connected with a tank T a load A, a pump P, another load B, and control ports X and Y.

The hydraulic cylinder 90 comprises a cylinder housing 92 with a piston 95 reciprocally mounted therein. A piston rod 91 is connected to said piston 95. The inner space of the cylinder housing 92 is divided up into a bottom side 93 and a rod side 94. Port A of main valve 80 is connected to the bottom side 93 via conduit 96. Port B of valve 80 is connected via conduit 97 with the rod side 94. The arrow V refers to the forward movement while the arrow R designates the reverse movement of the piston 95.

With regard to the operation of the main valve 80 and a pressure valve of the type shown in FIG. 1 in connection with a load 90 of FIG. 3 a first mode of operation will be discussed. According to this first mode of operation the proportional solenoid 4 is energized by means of a control current designated I10. The control current I10 causes the solenoid pin 7 to transmit a magnet force (i.e. a force which is created by the magnetic field of the solenoid) FM10 to the control spool 5. For the time being the proportional solenoid 3 is not yet energized. Due to the movement of control spool 5 in FIG. 1 towards the right-hand side, pump P is connected with B' and a pressure build-up occurs in operating chamber 24 and also in pressure chamber 89 of the main valve 80. Due to this pressure build-up the pressure metering spool 9 is exposed to pressure and moves the oppositely arranged pressure metering spool 10 into its appropriate longitudinal bore 14, and the control spool 6 and the solenoid pin 8 of the proportional solenoid 3 are moved against appropriate abutments (not shown). Further, force FM10 opposes the force created at the pressure metering surface 21 and a balance comes into effect according to which the pressure chamber 89 of the main valve 80 is supplied with pressurized fluid (i.e. pressurized oil), for example with a pressure of 10 bar. The main spool 86 will consequently move towards the left and opens the connection between the pump port P and the load port A of the main valve. The pressurized fluid will therefore flow via conduit 96 to the cylinder 90. A movement of piston 95 and piston rod 91 towards the right-hand side in the direction of arrow V is the consequence. The speed of said movement is predetermined by the pressure of, for instance, 10 bar in the pressure chamber 89. If the control current I10 remains in its on-state then the piston rod will be completely extended up until a mechanical abutment is reached.

In accordance with the invention it is provided that the control current I10 is maintained in its on-state, so that solenoid pin 7 continues to generate the force FM10. However, prior to reaching the end abutment the proportional solenoid 3 (which was in its "off" condition so far) is switched on. In accordance with the invention the proportional solenoid 3 is supplied with a control current I20 which causes the solenoid pin 8 to generate a magnet force FM20. This force FM20 is larger than the force FM10 generated by pin 7. For example, the force FM10 is adapted to generate a pressure of 20 bar at the load A' and, consequently, in pressure chamber 85 of main valve 80. While in the preceeding paragraph reference was made to a control current, more generally speaking a control signal can be used to energize the solenoids 3 and 4.

When switching-on the proportional solenoid 3 valve 1, which acts as a pilot valve, will operate as follows. The control spool 6 of valve 1 will move via pressure metering spool 10 the control spool 5 towards the left, so that the connection between pump P and load B' is interrupted. In face, B' is connected with tank port 61 and is consequently without pressure. As far as the main valve 80 is concerned tank pressure is present in the pressure chamber 89 and for example a pressure of 20 bar exists in pressure chamber 85, so that the main spool 86 in FIG. 3 is moved towards the right. As a consequence, pump P comes into connection with output or load B and consequently line 97 supplies the rod-side 94 of hydraulic cylinder 90 with pressure oil, so that the piston 95 moves in the direction of the arrow R.

If the hydraulic cylinder 92 is used for the operation of a drilling system, then the forward movement V may occur in the direction of drilling and the rearward movement occurs in the direction of arrow R.

To restart the movement of the piston rod 91 again in the direction of drilling it is only necessary to switch off the proportional solenoid 3. Proportional solenoid 4, which is still switched on will then cause the movement of the control spool 5 towards the right and the movement of the main spool 86 towards the left. The leftward movement of the main spool 86 again connects the pump P with the load A and therefore fluid will be supplied via conduit 96 to the bottom side 93 of the hydraulic cylinder 92.

In accordance with the invention it is only necessary to switch one of the solenoids, i.e. the proportional solenoid 3, while the other solenoid, i.e. the proportional solenoid 4 always remains switched on, i.e. does not have to be switched between "on" and "off" conditions.

FIG. 1 discloses the use of proportional magnets 4 and 5, respectively, on both sides of the valve housing. This makes it possible to differently control or energize the proportional solenoids 4 and 5 and it is therefore possible to provide for a variation of the forward movement V (operating movement) as well as of the rearward movement R. By selecting the energization or control of one of the proportional solenoids correspondingly, for instance, the control of the proportional solenoid 5 of FIG. 1, it is possible to have the rearward movement be executed in a rapid travel mode.

Instead of using two proportional solenoids 3 and 4 it is also possible to create different embodiments of the invention by using less than two proportional solenoids.

Therefore, another embodiment of the invention can be provided by replacing the proportional solenoid 4 of the embodiment shown in FIG. 1 by a spring which applies a constant force onto the control spool 5. This spring force will then define a predetermined forward movement V. The proportional solenoid 3 remains in place and is energized for initiating the reverse movement R as was explained in the preceeding example, i.e. the energisation is such that the force transmitted by the solenoid pin 8 is larger than the force created by the spring which replaces the proportional solenoid 4. The use of the proportional solenoid 3 allows a variable design of the reverse movement.

Another possibility and embodiment provides again for a replacement of the proportional solenoid 4 by a spring, so that a predetermined fixed forward movement is provided. Moreover, however, the proportional solenoid 3 is replaced by a less costly switching solenoid. The switching solenoid will generate a predetermined fixed magnet force at its solenoid pin. This magnet force has to be larger than the force of said spring. This embodiment will provide for a fixed or preset forward movement V and also for a fixed or preset reverse movement R.

Another possibility provides that the proportional solenoid 4 is kept so that a variable forward movement may be achieved. However, the proportional solenoid 3 is replaced by a switching solenoid, so that a fixed predetermined reverse movement R is realized.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What we claim is:

1. A pressure regulating valve comprising:
    a valve housing having a longitudinal bore defined by an inner bore surface;
    first and second control spools reciprocally mounted with outer ends and opposing spaced inner ends for movement in said housing bore between a rest position and an operating position, each spool defining with said inner bore surface an operating chamber adapted to be connected to a pressure fluid source in said operating position and disconnected in said rest position and each adapted to be connected to a respective load so fluid flows to said load in said operating position, each spool having a spool bore in communication with said operating chamber and defining a pressure metering area smaller than the cross-sectional area of the control spool;
    first and second metering spools respectively mounted for movement in said spool bores and extending into the space between said control spools to abut, each said metering spool responding to pressure in the respective operating chamber to apply a force to both control spools; and
    first and second actuating means for applying a force respectively to the outer end of said control spools to cause said spools to move to said operating position, the forces produced by said metering spools opposing the force applied by said actuating means.

2. A valve as in claim 1, wherein said actuating means respectively include proportional solenoids with a pin abutting said outer end of said control spool.

3. A valve as in claim 1, further including a spring between said inner ends of said control spools.

4. A valve as in claim 3, wherein said spring is a coil pressure spring extending between said inner ends.

5. A valve as in claim 1, wherein said control spools define respective pressure chambers on either side of the space between said control spools for communicating with said respective operating chambers when said control spool is in said operating position.

6. A valve as in claim 1, wherein said control spool has a cross bore and connecting bore for communicating and throttling said control bore with said operating chamber.

7. A valve as in claim 1 further including throttling conduits respectively connecting said loads to said operating chambers.

* * * * *